Patented Sept. 26, 1950

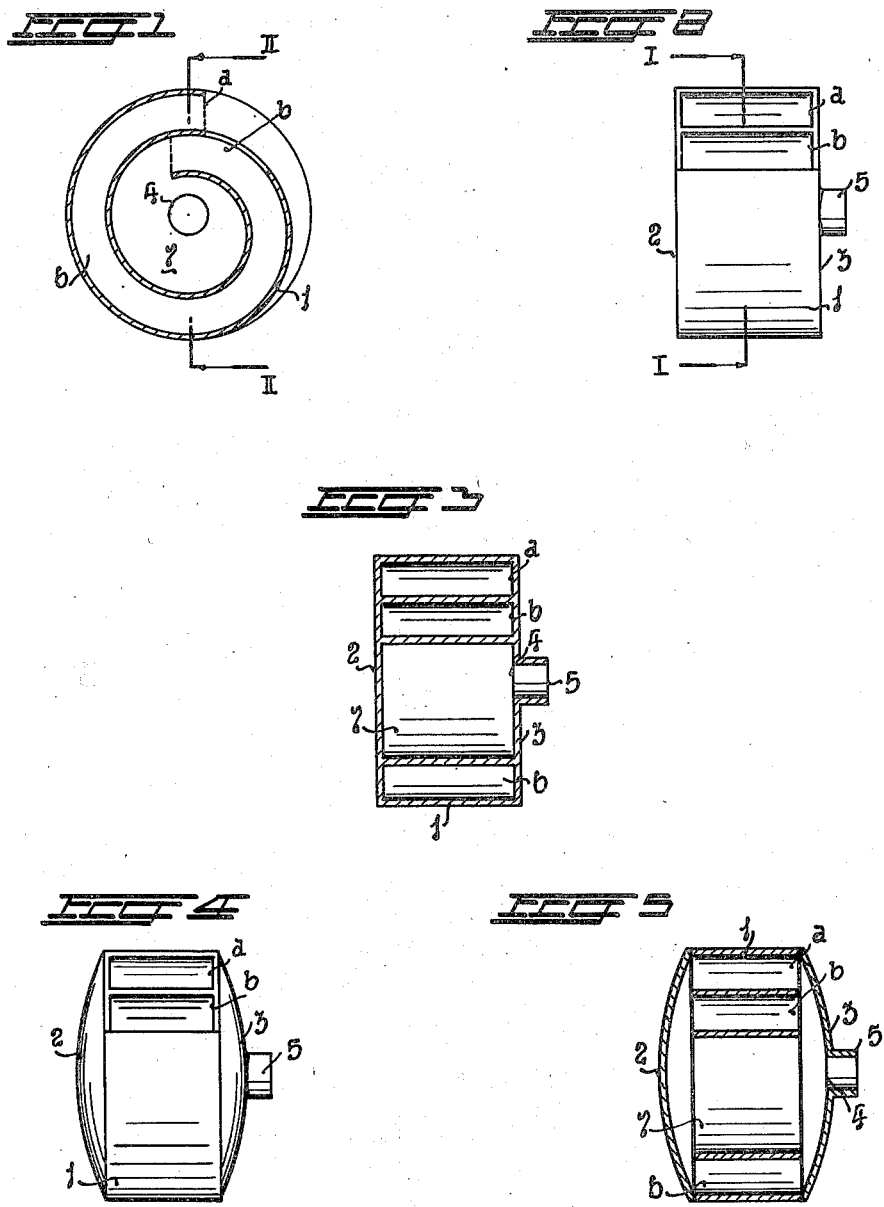

2,523,462

UNITED STATES PATENT OFFICE 2,523,462

TANGENTIAL INJECTOR BURNER FOR PULVERULENT FUEL AND AIR MIXTURE

Heriberto Enrique Guillermo Juan Clausen and Manuel Andrés González Fabiá, Buenos Aires, Argentina, assignors to Tecnica Industrial y Comercial Sociedad Anonima Tecosa, Buenos Aires, Argentina Application December 10, 1945, Serial No. 634,022

6 Claims. (Cl. 110—28)

This invention is related to an improved method for obtaining a fluid mixture possessing a high degree of combustibility. This method is based on the principle of channelizing a current of air between preheating surfaces which follow a circumferential trajectory of spiral development, and which submit the current of air to a heating process in progressive increasement until a point is reached where said current of air is converted into a perfect combustion agent of practically instantaneous action when entering into contact with the fuel.

This method of obtaining an improved fluid mixture consists, more precisely, in channelizing a current of air in a preheating zone of the form of a spiral with a trajectory equivalent to a substantially complete circumference, up to a feeding head of the fuel and into the combustion chamber, the entrance of which forms the zone of mixture of said fuel with the preheated air; and, having thus obtained the fluid mixture, projecting same endlessly into the combustion chamber which presents, correlatively with the preheating channel, a spiral development, which produces a cyclonic movement during the combustion of the fuel mixture, discharging the incandescent gases to the exterior at high velocity in a helicoidal trajectory through a discharge outlet or aperture centrally located in one of the lateral sides of the combustion chamber.

The mixture of hot air and fuel obtained on the basis of the aforementioned method and the cyclonic movement created in the combustion chamber produce perfect combustion of the fuel at very high temperatures, rendering this method applicable to many industrial uses, especially smelting furnaces and industrial furnaces in general.

Another object of the present invention is to provide an apparatus adapted for the practical use of the aforementioned method; this apparatus consists essentially of a casing in the form of a spiral with lateral sides, one of said sides being provided with a centrally located outlet or discharge aperture for discharging the incandescent gases resulting from the combustion of the fluid mixture.

Other objects and advantages of the present invention will be apparent from the following description, which, for the sake of clearness and understanding, has been illustrated with several drawings of the preferred embodiments of the apparatus, all of which are only illustrative examples, and in which:

Figure 1 represents a sectional view in elevation of the apparatus along the line I—I of Figure 2.

Figure 2 is an exterior profile view of the apparatus.

Figure 3 is a view of the apparatus in profile, and in cross-section along line II—II of Figure 1.

Figure 4 is a view, similar to that of Figure 2, showing the apparatus with a variation in the form of the lateral sides.

Figure 5 is a view, similar to that of Figure 3, showing the apparatus with the modified variation of Figure 4.

Referring now to the details of the various drawings, it will be noted that the apparatus adapted for the practical application of the method of obtaining a fluid mixture of high combustibility, consists of a casing 1 of spiral form, the lateral sides of which are closed by the lateral covers 2 and 3 forming a solid body with the casing. The cover or lateral side 3 is provided with a discharge outlet 4 located exactly in the axis center of the combustion chamber.

In the illustrations of Figures 1 to 3 the lateral sides 2 and 3 present a flat surface, while in the modified form of Figures 4 and 5 said sides present an outward convex configuration for the purpose of providing greater cubic capacity for the combustion chamber.

The casing 1 forms, in its spiral development, a preheating channel 6, which extends substantially one convolution of the spiral path, starting at $a$, which constitutes the entrance of the air to be preheated, up to the aperture $b$, where the fuel is injected and which constitutes the beginning of the combustion chamber 7 of the air-fuel fluid mixture, said entrance $b$ being the zone wherein the mixture or suspension of the fuel is produced, in an instantaneous manner, as soon as the fuel comes into contact with the current of preheated air.

The apparatus thus constructed and described is adapted for the practical application of the method devised for obtaining an intimate air-fuel mixture, and the subsequent perfect combustion of said fluid mixture. The construction of the combustion chamber 7 is such that it consists of a prolongation of the trajectory in which the combustion air and the fuel are mixed together, so that the reactions of the combustion and the most desirable physical-chemical conditions are maintained for the longest possible period. For this purpose, the theoretical combustion air enters at a pre-established velocity through the aperture or entrance $a$, injected under pressure by mechanical injecting means disposed for that purpose, following a spiral trajectory in the channel 6 of a substantially complete circumference of 360°, and upon reaching the entrance b, it enters into contact and is intimately mixed with the fuel injected under pressure at point b by suitable mechanical injecting means provided for that purpose, and properly located in front of said entrance b; in this way, the fluid mixture is projected into the combustion chamber 7 wherein the reactions of combustion take place, with the final discharge of the incandescent combustion gases to the exterior through the discharge outlet 4 and spout 5.

As it is obvious from the aforementioned description, and as a result of the special constructive characteristics of the combustion chamber, the following results are obtained:

1. The walls of the preheating channel 6 channelize the air in such a manner that it absorbs the calories transmitted by the wall of the combustion chamber 7 and, by convection, it refrigerates said wall, said air being preheated until the moment is reached where the fuel is injected at point b.

2. As a result of the power of impulse, the gases from the first reactions of the combustion are thrown towards the central zone or combustion chamber 7, in a centripetal movement, as a consequence of the increase of temperature and consequent decrease in density, and are discharged to the exterior through the discharge outlet 4.

3. The form of the combustion chamber 7 has the object of concentrating on its axis zone the produced heat, since the perpendicular reflection to the wall concentrates the heat radiations in such a manner that a maximum temperature is reached to complete the reaction in the focal center of the radiant surfaces.

4. A catalytic function is also obtained by constructing the walls of the combustion chamber with a suitable material, which, upon contact of the fluid mixture of preheated air and fuel, immediately initiates the combustion, while, at the same time, instantaneous cracking of the products in combustion is obtained, thus activating same and increasing the rapidity of the reactions.

It will be naturally understood that, before starting the apparatus, there must be created in the combustion chamber 7 the temperature required to operate the preheating of the circulating air in the channel 6 and to initiate the subsequent combustion of the fuel. For this purpose, any suitable heating agent, in reduced quantity, will be conditioned within said combustion chamber, but only sufficiently to raise the temperature of the walls to the desired degree, without, however, hindering the function of the apparatus.

From the foregoing it will be apparent to those skilled in the art that, on carrying the present invention into practice, minor variations may be introduced as regards the construction and appearance of the apparatus adapted to carry into practice the method described, without departing from the spirit and scope of this invention as clearly defined in the appended claims.

We claim:

1. Apparatus for producing fuel mixture having a high degree of combustibility, comprising a casing having two spaced end walls and between the same a spiral wall the outer end of which forms with the next convolution an inlet for the air supply, a separate fuel supplying means provided in said spiral wall and circumferentially spaced from said inlet, and a discharge means for the incandescent fuel mixture arranged in the center of one of said end walls.

2. Apparatus for producing fuel mixture having a high degree of combustibility, comprising a casing having two spaced end walls and between the same a spiral wall the outer end of which forms with the next convolution an inlet for the air supply, a separate fuel supplying means provided in said spiral wall and circumferentially spaced from said inlet a distance of substantially 360°, and a discharge means for the incandescent fuel mixture provided in the center of one of said end walls.

3. Apparatus for producing fuel mixture having a high degree of combustibility, comprising a casing having two spaced end walls and between the same a spiral wall having a plurality of convolutions, the outer end of said spiral wall forming with the next convolution an inlet for the air supply, a separate fuel supplying means provided in said spiral wall and circumferentially spaced from said inlet, and a discharge means for the incandescent fuel mixture provided in the center of one of said end walls.

4. An apparatus for producing fluid mixtures having a high degree of combustibility, comprising a spiral casing having two end walls, separate means for supplying air and for supplying fuel under pressure into the spiral channel formed in said casing, one of said end walls being provided with a central discharge outlet for the incandescent combustion gases.

5. An apparatus for producing fluid mixtures having a high degree of combustibility, comprising a spiral casing with two end walls, separate means for supplying air and for supplying fuel under pressure into said casing, the outer part of the spiral forming the preheating zone for the air, and the inner part of the spiral forming the combustion chamber for the mixture of fuel and air, one of said end walls being provided with a discharge outlet for the incandescent combustion gases, said outlet being centrally located in said end wall.

6. An apparatus for producing fluid mixtures having a high degree of combustibility, comprising a spiral casing having two end walls, separate means for supplying fuel and for supplying air under pressure into said casing; said end walls being convex and one of the same being centrally provided with a discharge outlet for the incandescent combustion gases.

HERIBERTO ENRIQUE
GUILLERMO JUAN CLAUSEN.
MANUEL ANDRÉS GONZÁLEZ FABIÁ.

REFERENCES CITED

The following references are of record in the file of this patent:

UNITED STATES PATENTS

| Number | Name | Date |
|---|---|---|
| 836,145 | Schutz | Nov. 20, 1906 |
| 836,219 | Schutz | Nov. 20, 1906 |
| 1,061,469 | Gobbe | May 13, 1913 |
| 1,373,776 | Taylor | Apr. 5, 1921 |
| 1,618,469 | Burg | Feb. 22, 1927 |
| 1,924,209 | Kilgour | Aug. 29, 1933 |
| 2,023,696 | Porteous | Dec. 10, 1935 |
| 2,096,765 | Saha | Oct. 26, 1937 |
| 2,407,188 | Sutton | Sept. 3, 1946 |